United States Patent
Liu et al.

(10) Patent No.: US 11,481,380 B2
(45) Date of Patent: Oct. 25, 2022

(54) DATA CONSISTENCY CHECK IN DISTRIBUTED SYSTEM

(71) Applicant: Microsoft Technology Licensing, LLC, Redmond, WA (US)

(72) Inventors: Xiaotian Liu, Beijing (CN); Wei Xiao, Beijing (CN); Sheng Liang, Beijing (CN); Chunfeng Chen, Beijing (CN); Zhan Li, Beijing (CN); Fan Zhang, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 245 days.

(21) Appl. No.: 16/480,586

(22) PCT Filed: Mar. 31, 2017

(86) PCT No.: PCT/CN2017/079051
§ 371 (c)(1),
(2) Date: Jul. 24, 2019

(87) PCT Pub. No.: WO2018/157430
PCT Pub. Date: Sep. 7, 2018

(65) Prior Publication Data
US 2019/0384758 A1 Dec. 19, 2019

(30) Foreign Application Priority Data
Feb. 28, 2017 (CN) .......................... 201710114248.4

(51) Int. Cl.
*G06F 7/00* (2006.01)
*G06F 17/00* (2019.01)
*G06F 16/23* (2019.01)

(52) U.S. Cl.
CPC ...... *G06F 16/2365* (2019.01); *G06F 16/2379* (2019.01)

(58) Field of Classification Search
None
See application file for complete search history.

(56) References Cited

U.S. PATENT DOCUMENTS 6,751,636 B1  6/2004 Mende et al.
7,277,905 B2  10/2007 Randal et al.
(Continued)

FOREIGN PATENT DOCUMENTS

CN  1784677 A    6/2006
CN  101192971 A  6/2008
(Continued)

OTHER PUBLICATIONS

International Search Report and Written Opinion, PCT/CN2017/079051, dated Nov. 20, 2017, 11 pages.
(Continued)

*Primary Examiner* — Tuan A Pham
(74) *Attorney, Agent, or Firm* — Workman Nydegger

(57) ABSTRACT

Scanning and rescanning detect state inconsistencies between data entities in repositories or other components of a distributed computing environment. First, entities are scanned based on a cutoff time T0. Entities for which state comparison is undesired are placed in a skipped entity list. Any inconsistencies found in other entities is reported. Then subsequent rescanning fetches state and attempts to pare down the skipped entity list. Rescanning may be capped.

(Continued)

Inconsistencies may be detected without requiring downtime from services that update data entity state, and false reports of inconsistency may be avoided.

20 Claims, 5 Drawing Sheets

(56) References Cited

U.S. PATENT DOCUMENTS

| | | | |
|---|---|---|---|
| 7,711,716 | B2 | 5/2010 | Stonecipher |
| 7,774,319 | B2 | 8/2010 | Schweigkoffer et al. |
| 8,326,800 | B2 | 12/2012 | Cunningham et al. |
| 9,235,607 | B1* | 1/2016 | Ross .................... G06F 16/215 |
| 2005/0223043 | A1* | 10/2005 | Randal .................. G06F 16/221 |
| 2008/0140734 | A1 | 6/2008 | Wagner |
| 2008/0222150 | A1 | 9/2008 | Stonecipher |
| 2009/0172298 | A1 | 7/2009 | Yoon et al. |
| 2010/0005124 | A1 | 1/2010 | Wagner |
| 2012/0109906 | A1 | 5/2012 | Wagner |
| 2014/0025646 | A1 | 1/2014 | Canales Valenzuela et al. |
| 2016/0110406 | A1* | 4/2016 | Zircher .............. G06F 16/2365 707/690 |
| 2016/0335079 | A1 | 11/2016 | Tammam et al. |
| 2017/0031969 | A1* | 2/2017 | Smits .................... G06F 16/13 |

FOREIGN PATENT DOCUMENTS

| | | |
|---|---|---|
| CN | 102934114 A | 2/2013 |
| CN | 105589961 A | 5/2016 |
| CN | 106294611 A | 1/2017 |
| EP | 1574955 A1 | 9/2005 |
| WO | 2013187816 A1 | 12/2013 |

OTHER PUBLICATIONS

"Extended European Search Report Issued In European Patent Application No. 17898566.9", dated Aug. 27, 2020, 6 Pages.

Pitoura, et al., "Data Consistency in Intermittently Connected Distributed Systems", In Journal of IEEE Transactions on Knowledge and Data Engineering, vol. 11, Issue 6, Nov. 1999, pp. 896-915.

Schaub, et al., "ECAI 2014: 21st European Conference on Artificial Intelligence", In Publication of IOS Press, Aug. 18, 2014, 1 Page.

"Office Action Issued in European Patent Application No. 17898566.9", dated Nov. 24, 2020, 4 Pages.

"Notice of Allowance and Search Report Issued in Chinese Patent Application No. 201710114248.4", dated May 8, 2021, 5 Pages.

* cited by examiner

DATA CONSISTENCY CHECK IN DISTRIBUTED SYSTEM

BACKGROUND

In a cloud computing environment or other distributed system, data may be spread across different repositories. However, pursuit of a healthy system or other constraints may encourage or require that the data in different repositories be consistent with each other. This can be challenging.

SUMMARY

Some technologies described herein are directed to the technical activity of verifying data consistency across data repositories. Some are directed in particular to verifying data consistency across data repositories while reducing or avoiding service down time during data consistency checks. Some are directed in particular to verifying data consistency across data repositories while reducing or avoiding false alarms of inconsistency while data is updating. Other technical activities pertinent to teachings herein will also become apparent to those of skill in the art.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
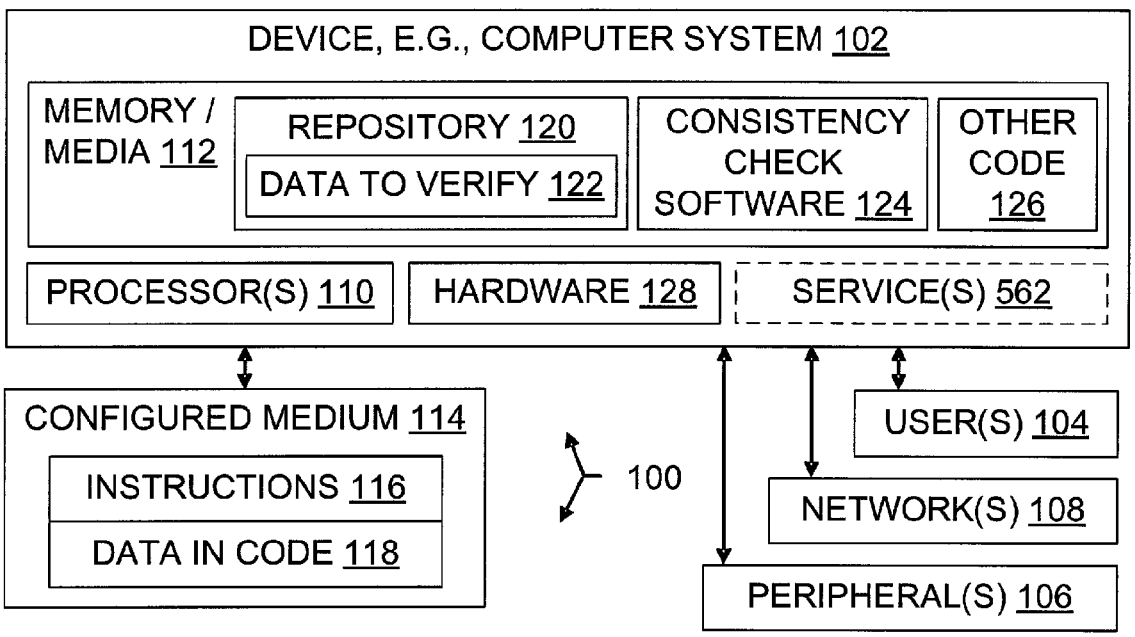
FIG. 1 is a block diagram illustrating a computer system in a distributed environment, the computer system having at least one processor and at least one memory which interact with one another under the control of software, and also illustrating some configured storage medium examples.

A distributed software system may include multiple data repositories connected by respective services. Data in a repository that is maintained or updated by a given service may keep updating intermittently or at intervals while the service is up and running. The data in different repositories may need to be consistent with each other to satisfy health, operational, transactional, or other constraints. In certain cases, a service admin may want or need to verify the data consistency across data repositories, such as after a restore. Problems presented may include how to avoid service down time during data consistency checks, and how to avoid false alarms that would be reported or otherwise require handling if they occur while data is updating.

One familiar approach is to take services offline during a data consistency check. This approach can avoid false alarms, since the data to be checked won't be modified during the check. A disadvantage is that this approach increases the service downtime. The larger the data volume, the larger the downtime could be. If the data volume is big, downtime can be quite considerable, even to the point of violating Service Level Agreements.

Another familiar approach is to place all data repositories on a single data store. This approach may guarantee that all data can be backed up to a single point of time, so it avoids the consistency problem in a later restore. But it sacrifices the system scalability and may not be acceptable for a distributed system.

Some embodiments described herein may be viewed in a broader context. For instance, concepts such as availability, comparison, consistency, and existence may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving availability, comparison, consistency, or existence are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. For example, some embodiments address technical activities that are rooted in distributed system computing technology, such as data consistency across distributed repositories, and reducing or avoiding service downtime in a distributed computing system. Also, one of skill will acknowledge that the consistency checks described herein cannot be performed mentally or by pencil and paper, but must instead utilize software executed by processor hardware operating at computational speeds to perform comparisons and calculations using digital data stored in digital storage devices. In addition, technical effects provided by some embodiments include efficient detection of data inconsistencies without unnecessary false positive reports and without the single-data-store and data-size-proportional-downtime restrictions of earlier approaches. Other advantages and technical characteristics will also be apparent to one of skill from the description provided.

Acronyms and Abbreviations

Some acronyms and abbreviations are defined below. Others may be defined elsewhere herein or require no definition to be understood by one of skill.

ALU: arithmetic and logic unit
API: application program interface
APP: application
CD: compact disc
CPU: central processing unit DVD: digital versatile disk or digital video disc
FPGA: field-programmable gate array
FPU: floating point processing unit
GPU: graphical processing unit
GUI: graphical user interface
IDE: integrated development environment, sometimes also called "interactive development environment"
MPI: message passing interface
OS: operating system
RAID: redundant array of inexpensive disks, or redundant array of independent disks
RAM: random access memory
ROM: read only memory Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, smartwatches, smartbands, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on server computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Capacity" means use or control of one or more computational resources.

"Optimize" means to improve, not necessarily to perfect. For example, it may be possible to make further improvements in a program or an algorithm which has been optimized.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"Service" means a program in a cloud computing environment.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

A "hypervisor" is a software platform that runs virtual machines. Some examples include Xen® (mark of Citrix Systems, Inc.), Hyper-V® (mark of Microsoft Corporation), and KVM (Kernel-based Virtual Machine) software.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as listing entities, fetching entity state, and comparing entities, are understood herein as requiring and providing speed and accuracy that are not obtainable by human mental steps, in addition to their inherently digital nature. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, at least, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, at least, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as comparing, fetching, listing, timing out, and others recited herein (and compares, compared, fetches, fetched, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, at least, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 cloud computing operating environment, also referred to as a cloud or as an operating environment
102 computer system
104 users
106 peripherals
108 network
110 processor
112 computer-readable storage medium, e.g., RAM, hard disks
114 removable configured computer-readable storage medium
116 instructions executable with processor
118 data
120 data repository
122 data whose consistency is checked, or will be checked
124 data consistency checking software
126 other software, e.g., hypervisor, firmware, applications
128 system hardware in addition to processor and memory
200 consistency check system
202 set of data
204 skipped entity list
206 issues list, a.k.a. inconsistency list
208 variables, e.g., t0 cutoff, rescan rounds cap, rescan execution time cap, lists including those not otherwise designated
210 to-be-checked list
212 component that contains data entities to be consistency-checked
402 timestamp
404 user-visible portion of data
406 entity identifier
500 flowchart
502 list (verb) an entity to be checked
504 skip (at least for now) consistency check on an entity
506 put entity in skip list
508 exist (something done by a data entity in a repository or other component)
510 avoid a false alarm of data inconsistency
512 false alarm
514 compare data portions of two entities
516 modify data portion of an entity (or delete entity)
518 trigger inconsistency alarm
520 data inconsistency alarm
522 scan data entities for inconsistency
524 rescan data entities for inconsistency
526 phase during scan or rescan for inconsistency
528 check entities in skipped entity list
530 fetch entity latest state
532 entity latest (most recent) state
534 test whether entity state was changed
536 use a timeout mechanism to limit the rescan rounds or the rescan execution time; limit may be increased or decreased relative to prior limit
538 timeout mechanism
540 limit the rescan rounds
542 rescan rounds
544 return the skipped entity list
546 return the issue (inconsistencies) list
548 added entity to the issues list
550 rescan execution time
552 reduce false negatives
554 false negatives
556 report inconsistency in data or other state
558 inconsistency in data or other state 560 avoid requiring downtime from services that update data entity state
562 services that update data entity state
564 downtime of services that update data entity state
566 select a cutoff time value
568 a cutoff time value, e.g., T0
570 leave entity in skipped list
602 scan logic (software and hardware, or special-purpose hardware)
604 rescan logic (software and hardware, or special-purpose hardware)
606 lists generally
608 rescan caps Operating Environments With reference to FIG. 1, an operating environment 100 for an embodiment, also referred to as a cloud 100 or distributed system 100, includes at least two computer systems 102. One computer system 102 is shown. The computer systems 102 in a distributed system may be identical in terms of hardware, software, or both, but may also differ from one another with regard to hardware, software, or both. A given computer system 102 may be a multiprocessor computer system, or not. One or more machines in a given computer system may be clustered, client-server networked, and/or peer-to-peer networked within a cloud 100. An individual machine is a computer system, and a group of cooperating machines is also a computer system. A digital storage device or other digital storage resource, such as a hard disk, RAID system, array of disks, network attached storage, or other non-volatile storage device, is also a computer system. A given computer system 102 may also be configured as a computational resource for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other user interface (UI) presentations.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part or all of a system 102 in other embodiments; it may be possible to map a given example to claims in more than one way. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 of the code configuring the medium also configure that computer system.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (CPUs, ALUs, FPUs, and/or GPUs), memory/storage media 112, an operating environment may also include other hardware 128, such as displays, batteries, buses, power supplies, wired and wireless network interface cards, accelerators, racks, and network cables, for instance. A display may include one or more touch screens, screens responsive to input from a pen or tablet, or screens which operate solely for output. Cloud hardware such as processors, memory, and networking hardware are provided at least in part by an IaaS (Infrastructure as a Service) provider. In some cases, access to cloud hardware may also be provided at least in part by a PaaS (Platform as a Service) provider.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things, such that no human user 104 interacts directly with the embodiment. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

In some embodiments, a portion of the data 122 is representative of real-world items such as product characteristics, inventories, physical measurements, settings, images, readings, targets, volumes, and so forth. Such data is also transformed by backup, restore, commits, aborts, reformatting, and/or other technical operations.

The data 122 to verify, the data consistency checking code 124, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items may be shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

Consistency Check Examples

Examples are provided herein to help illustrate aspects of the technology, but the examples given within this document do not describe all of the possible embodiments. Embodiments are not limited to the specific implementations, arrangements, displays, features, approaches, or scenarios provided herein. A given embodiment may include additional or different technical features, mechanisms, sequences, or data structures, for instance, and may otherwise depart from the examples provided herein.

Figure 2:
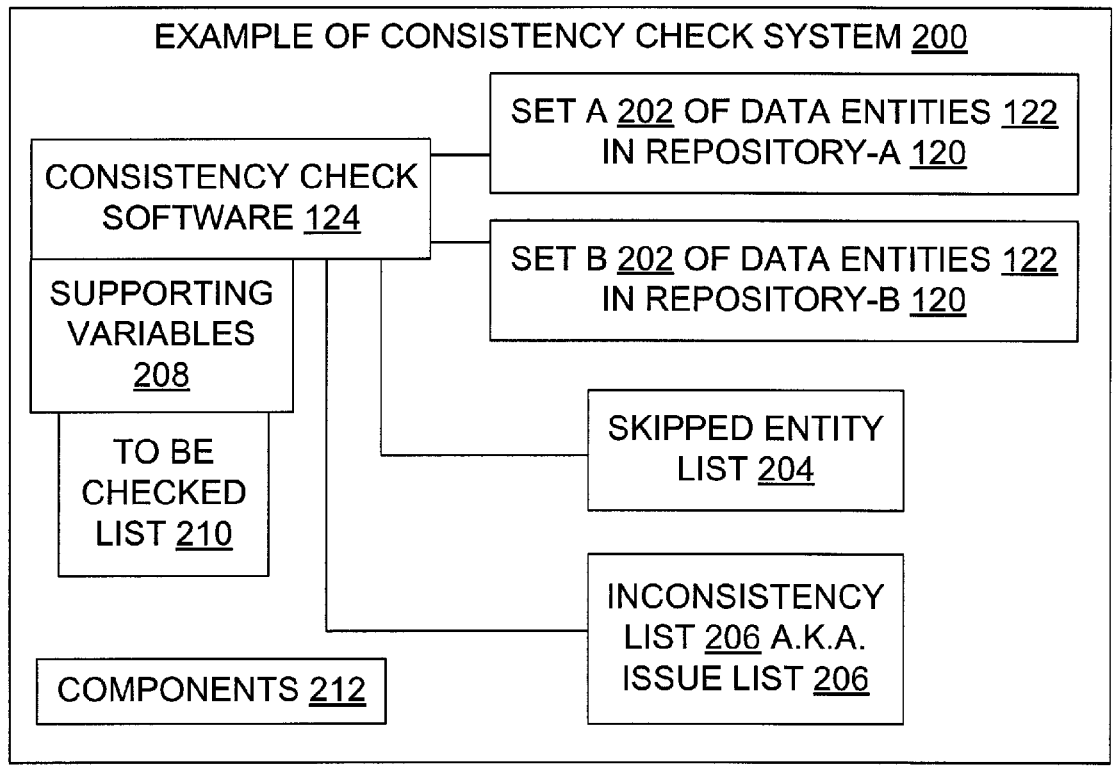
FIG. 2 is a block diagram illustrating aspects of an consistency check system.
Figure 4:
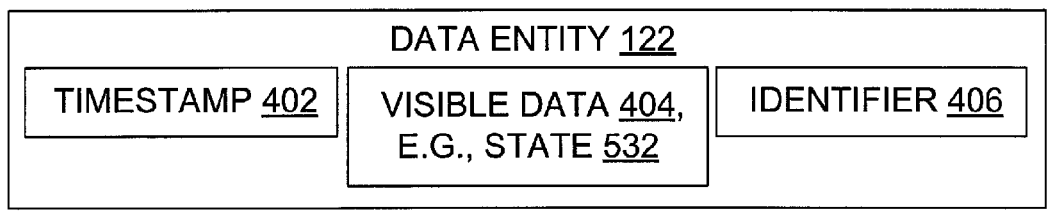
FIG. 4 is a block diagram illustrating aspects of a data entity.
Figure 6:
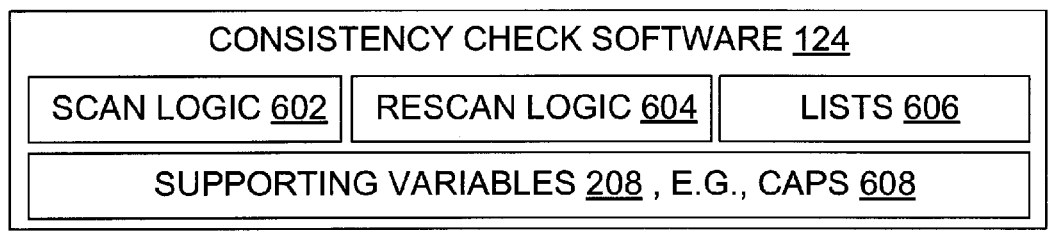
FIG. 6 is a block diagram illustrating aspects of some consistency checking software.

As illustrated, e.g., with FIGS. 2, 4, and 6, some embodiments use an algorithm implemented in a consistency check system 200 to check the data consistency in a distributed online system 100. The system 100 can serve normally during the data consistency check. The consistency check system 200, also referred to as a data consistency scan system 200 or the like, includes a system 102 which is tailored to perform an algorithm implemented with consistency check software 124. The algorithm operates on two or more sets 202 of data in respective repositories 120. The data 122 whose consistency is checked is organized into entities, also referred to using reference numeral 122. During the consistency check, an instance of a given entity 122 in one repository is compared to an instance of the same entity in another repository to see if they are consistent, that is, to see whether the portion 404 of the data that is seen by users is the same. Portions of the data that are not seen by users, such as bits following an end-of-file marker, may differ without violating consistency. Also, physical locations will clearly differ, and corresponding characteristics of physical storage, such as the number of sectors allocated and page size, may also differ without violating consistency.

The illustrated consistency check system 200 also includes and maintains a skipped entity list 204, an issues list 206, and supporting variables 208 such as the current time cutoff T0 that defines which entities are compared and which are too new to compare, and rescan caps.

Figure 5:
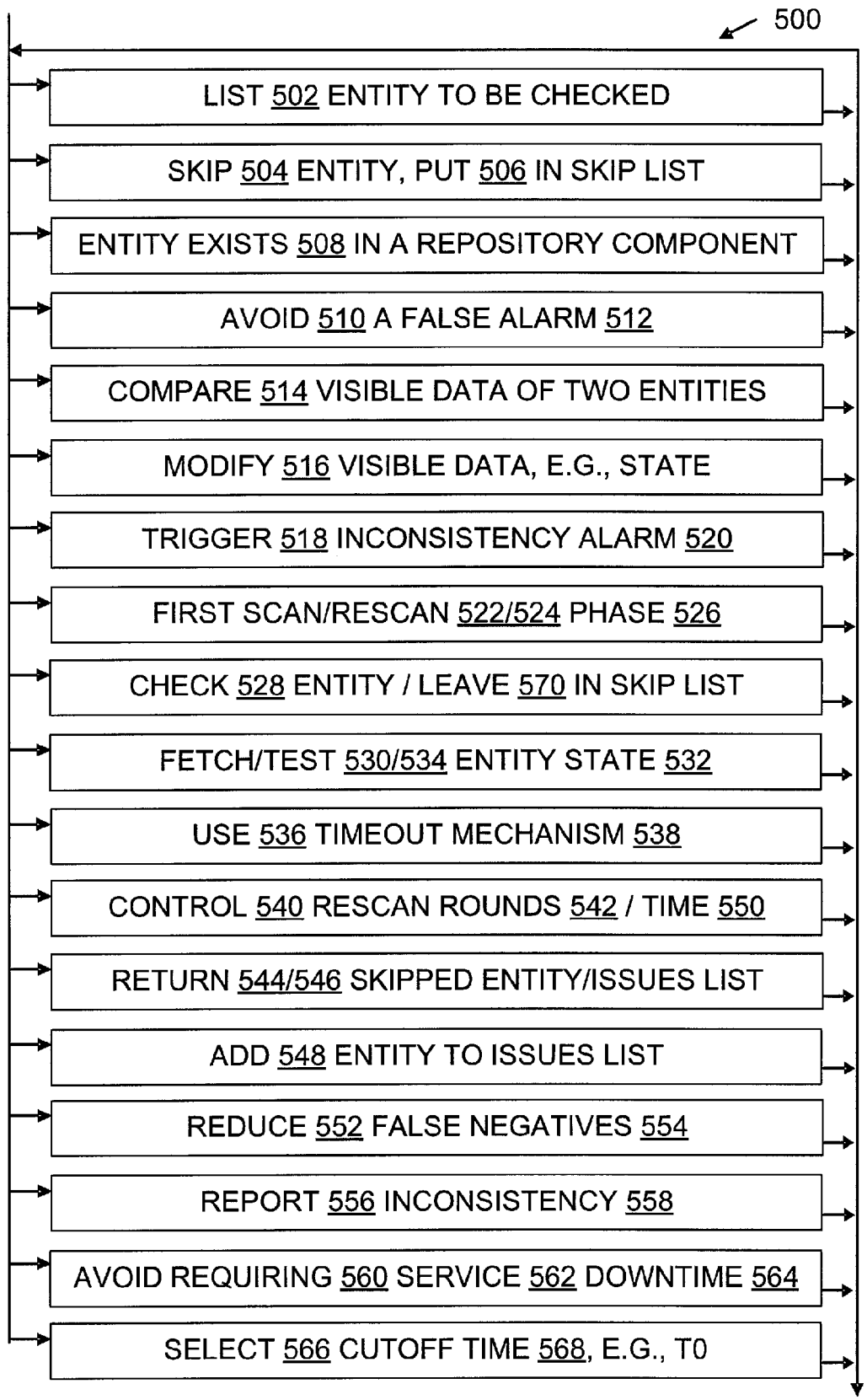
FIG. 5 is a flow chart illustrating aspects of some process and configured storage medium examples.

FIG. 5 illustrates some process embodiments in a flowchart 500. Technical processes shown in the Figures or otherwise disclosed will be performed automatically by consistency check system 200, unless otherwise indicated. Processes may also be performed in part automatically and in part manually to the extent action by a human administrator or other human person is implicated. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIG. 5. Steps may be performed serially, in a partially overlapping manner, or fully in parallel. The order in which flowchart 500 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

For convenience, the following description depicts an target online system 100 containing two repository components A and B, with the data on A and B related to each other. In other examples, there could be more than two components, because the approaches presented here can be extended. For example, if there is a third component C whose data is also associated to A and B's, an embodiment could first check the consistency between A and B, then check the consistency between B and C, and finally consolidate their results together by placing them all into a single issues list 206.

In the illustrated architecture, the entities 122 to be checked each have a respective timestamp attribute 402 which indicates their last modification time. The entities in component A and B also share a common unique key attribute as entity identifier 406, e.g. student id, which is unique and won't be reused In the example of this illustrated architecture, some assumptions are made. One assumption is that during a consistency scan, an entity which has been deleted won't appear again. That is, if an entity which has unique id X has been deleted, then no entity with that id X will be encountered or present during the consistency scan. Another assumption is that local machine time differences between any of the machines in the system are predictable. In other words, there is a known or determinable maximum or cap on machine time differences.

In some embodiments, a data scan proceeds in phases, as follows.

First scan 522 phase 526: scan logic 602 lists 502 in a to-be-checked list 210 all the entities from A and B, but only checks the entities which are not modified after time T0, where T0=ST−TD, ST is the data scan start time, TD is the maximum machine time differences between machines 212. With this approach, an embodiment may guarantee that all the scanned data reflects the system state at the same time point T0. In a first scan, the following entities will be skipped 504 and put 506 into a skipped entity list:

(Exist, Exist) entity, namely an entity which exists 508 in both components 212 but one or both component instances were modified 516 after T0.

(Exist, Not Exist) entity, namely, an entity which does not exist on one side, i.e., is not present in one of the components. This kind of entity is skipped 504 in a first scan because one cannot know the last modified time of a "non-exists" entity, so tailored rescan logic 604 is used in one or more rescan phases to avoid 510 a false alarm 512 for such entities.

Otherwise, one can compare 514 the two entities and the entity info from both sides (e.g., both repositories), and trigger 518 the alarm 520 if they are not consistent.

Rescan 524 phase 526: rescan logic 604 can be executed multiple times. In an efficient example, rescan will only check 528 the entities in the skipped entity list which was generated 506 from a prior round of scanning. For each of the entities one is checking, rescan logic will fetch 530 the entity latest states 532 twice from both components in a specified order: →A→B→A→B, where "→A" means fetch the entity's latest state from component A. The rescan check logic includes software and hardware implementing the following:

For (Exist, Exist) cases, the entity will be checked if testing 534 determines that its state was not changed during two fetch operations in any of the two components 212. Otherwise, it will be put 506 into the skipped entity list again for next round of rescan.

For (Exist, Not Exist) cases, the entity will be checked only if testing 534 determines that its state was not changed during two fetch operations for both components 212. Otherwise, it will be put 506 into skipped entity list again for the next round of rescan.

In some examples, a caller can use 536 a timeout mechanism 538 or limit 540 the rescan rounds 542 to control the rescan execution time 550, or limit 540 rescan time 550 directly. Examples may return 544 the skipped entity list for awareness in the result. The skipped entities may be added 548 into the issues list, because they keep changing during the scan.

False negatives 554 are the true inconsistency issues that were not caught in the data scan. It's possible to have false negatives because the rescan phase could be ended even though there are still entities in the skipped entity list, due to timeout or reaching to the max rescan time or rounds constraint.

The false negatives can be reduced 552 by increasing 540 the max rescan times, or can be caught in the future data scans. If an invalid entity stays in the system, eventually it should be caught by the data scan. Even in the extreme situation that an entity is modified quite frequently and will never be checked, it is most likely in a healthy state rather than an inconsistent state, because an unhealthy entity would probably not be updated so frequently.

Figure 3:
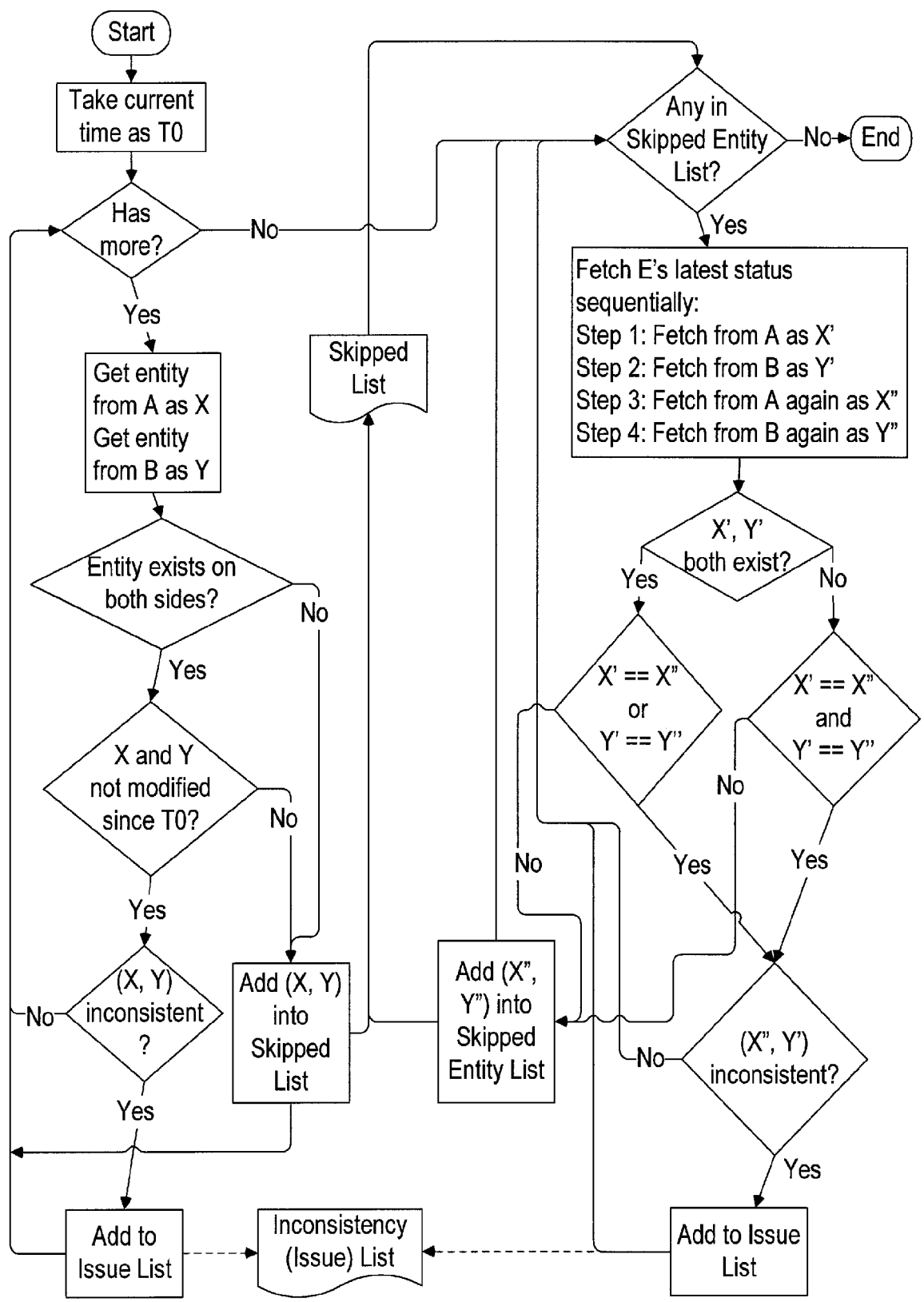
FIG. 3 is a flowchart illustrating a consistency checking algorithm.

FIG. 3 shows a flowchart which further illustrates an algorithm suitable for implementing consistency checking as taught herein. At the start, the algorithm takes T0 as a current cutoff time. Then the algorithm enters a loop which is controlled by a decision labeled "Has more?" that asks whether there are more entities to check for consistency. If "No", meaning there are no more entities to check for consistency, control moves to a decision labeled "Any in Skipped Entity List?" that asks whether there are any entities in the Skipped Entity List (also called the "Skipped List" in FIG. 3). If "No", meaning there are no entities in the Skipped Entity List, the current execution of the algorithm ends. If "Yes", meaning there is at least one entity in the Skipped Entity List, the algorithm does the following:

Fetch entity E's latest status sequentially:

Step 1: Fetch the entity E from component A as X'
Step 2: Fetch the entity E from component B as Y'
Step 3: Fetch the entity E from component A again as X"
Step 4: Fetch the entity E from component B again as Y"

After these fetch operations, control moves to a decision labeled "X', Y' both exist?" that asks whether entity E was found to exist in both Step 1 and Step 2 of the fetch operations. If the answer to "X', Y' both exist?" is "Yes", meaning entity E was found to exist in both Step 1 and Step 2 of the fetch operations, then control moves to a decision labeled "X'==X" or Y'==Y"" that asks whether X' equals X" or Y' equals Y". If the answer to "X', Y' both exist?" is "No", meaning entity E was not found to exist in both Step 1 and Step 2 of the fetch operations, then control moves to a decision labeled "X'==X" and Y'==Y"" that asks whether X' equals X" and Y' equals Y". If the answer to "X'==X" or Y'==Y"" is "No" then the algorithm adds (X", Y") to the Skipped Entity List, as shown by the block labeled "Add (X", Y") to Skipped Entity List". Also, if the answer to "X'==X" and Y'==Y"" is "No" then the algorithm adds (X", Y") to the Skipped Entity List, as also shown by the block labeled "Add (X", Y") to Skipped Entity List". After the algorithm adds (X", Y") to the Skipped Entity List, control goes again to the decision labeled "Any in Skipped Entity List?" and proceeds as discussed.

If the answer to "X'==X" or Y'==Y"" is "Yes", or if the answer to "X'==X" and Y'==Y"" is "Yes", then control moves to a decision labeled "(X", Y') inconsistent?". If the answer is "No" then control goes again to the decision labeled "Any in Skipped Entity List?" and proceeds as discussed. If the answer to "(X", Y') inconsistent?" is "Yes" then the algorithm adds (X", Y') to the Issue List (also called the "Inconsistency List" in FIG. 3), and then control goes again to the decision labeled "Any in Skipped Entity List?" and proceeds as discussed. One of skill will understand that asking "(X", Y') inconsistent?" is an optimization, in the following sense. If (X'==X" or Y'==Y") then if (X'==X") one would check the consistency of (X', Y'), which equates with (X", Y'), else if (Y'==Y") one would check the consistency of (X", Y"), which equates with (X", Y'). Moreover, if (X'==X" and Y'==Y") then one would check the consistency of (X', Y') which equates with (X", Y") or (X", Y'). Accordingly, one can optimize the algorithm by always checking the consistency of (X", Y').

Now consider situations wherein the answer to "Has more" is "Yes", meaning there is at least one more entity to be consistency checked. The algorithm fetches the entity from component A as X and from component B as Y, as indicated by the block labeled "Get entity from A as X Get entity from B as Y". Then control goes to a decision labeled "Entity exists on both sides?" which asks whether the entity exists in both component A and component B. If "No" then the algorithm adds (X, Y) into the Skipped List, as indicated by the block labeled "Add (X, Y) into Skipped List" and the item labeled "Skipped List" and then control goes to the decision labeled "Any in Skipped Entity List?" and proceeds as discussed. If the answer to "Entity exists on both sides?" is "Yes" then control goes to a decision labeled "X and Y not modified since T0?" which asks whether X and Y have not been modified since the cutoff time T0. If the answer is "No", meaning there has been modification since T0, then the algorithm adds (X, Y) into the Skipped List, as indicated by the block labeled "Add (X, Y) into Skipped List" and the item labeled "Skipped List" and then control goes to the decision labeled "Any in Skipped Entity List?" and proceeds as discussed. If the answer is "Yes", meaning there has not been modification since T0, then the algorithm proceeds to a decision labeled "(X, Y) inconsistent?". If the answer is "No" then control returns to the "Has more?" decision and proceeds as discussed. If the answer is "Yes", meaning (X, Y) is inconsistent, then (X, Y) is added to the Issue List (also called the "Inconsistency List") and then control returns to the "Has more?" decision and the algorithm proceeds as discussed.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as consistency check software 124, skipped list 204, and other lists, in the form of data 118 and instructions 116, read from a removable medium 114 and/or another source such as a network connection, to form a configured medium. The configured medium 112 is capable of causing a computer system to perform technical process steps for verifying data consistency as disclosed herein. The Figures thus help illustrate configured storage media embodiments and process embodiments, as well as system and process embodiments. In particular, any of the process steps illustrated in FIG. 3, FIG. 5, or otherwise taught herein, may be used to help configure a storage medium to form a configured medium embodiment.

Illustrative Analysis

The following analysis illustrates how the two-phase scan disclosed herein can achieve a zero false alarm goal.

System abstraction. Assume there is a distributed system which consists of two components: A, B. A and B have a relationship on an entity E. The relationship of A and B is defined as follows:

1. E in A has m possible states: A1, A2, . . . , Am.
    a. Once E in A leaves from state A1, it will never back to A1; (start state)
    b. Once E in A comes to state Am, it will never go to other states; (end state)
    c. A1 and Am cannot be distinguished with the state value.
2. E in B has n possible states: B1, B2, . . . , Bn.
    a. Once E in B leaves from state B1, it will never back to B1; (start state)
    b. Once E in B comes to state Bn, it will never go to other states. (end state)
    c. B1 and Bn cannot be distinguished with the state value.
3. M(S) is a function to get the time point at which E comes to state S.
    a. M(A1) and M(B1) is unknown, (for analysis, consider it to have never existed);
    b. M(Am) and M(Bn) is unknown, (for analysis, consider it existed, but has been cleaned up);
    c. For all other states except A1, B1, Am, Bn, M(S) is not unknown.
4. At any given time p, E in A must be in one and only one state.
5. At any given time p, E in B must be in one and only one state.
6. For any given two states S1, S2 in A or B, if S1==S2 indicates M(S1)==M(S2).
7. The system state at time point p is defined as the combination of E in A's state at p and E in B's state at p. Then there are m*n possible combinations of system states: (A1, B1), (A1, B2), . . . , (Am, Bn).
    a. Among these possible system states, a number of them are defined as invalid system states. Assuming (Ai, Bj) is an invalid system state, then the definition of the invalid system state is: at any given time point, if E in A's state is Ai, E in B's state must not be Bj; and if E in B's state is Bj, E in A's state must not be Ai.
    b. All other system states that are not invalid system states are defined as valid system states.
    c. If (A0, Bj) is an invalid system state, then (Am, Bj) is also an invalid system state.
    d. If (Ai, B0) is an invalid system state, then (Ai, Bn) is also an invalid system state.
8. E in A's state can only be retrieved from A, E in B's state can only be retrieved from B. Assume S is E's state in A or B at a time point, define:
    a. ST(S) is a function to get the start query time of state S;
    b. RT(S) is a function to get the receipt time of state S;
    c. ST(S)<RT(S) is always true;
    d. Based on above one can always find a time between ST(S) and RT(S) such that the E's state is S, and use function T(S) to get this time. Then ST(S)<=T(S)<=RT(S).

Entity check logic design. First scan logic for entity E:

Specify a time t0<now, which is the data scan time dividing line. Entities modified after t0 will not be checked.

Retrieve E's state in A as At0 after t0, which derives ST(At0)>t0;

Retrieve E's state in B as Bt0 after t0, which derives ST(Bt0)>t0.

Figure 7:
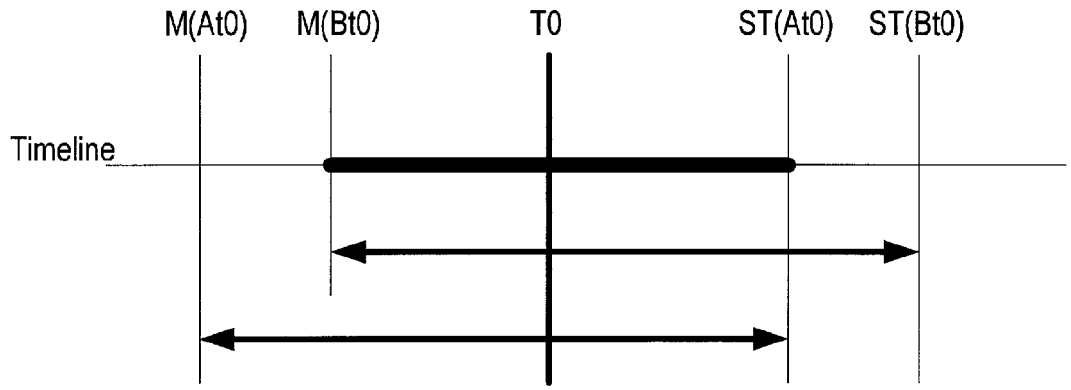
FIGS. 7 through 9 are timeline diagrams illustrating aspects of an analysis of some consistency checking processes.
Figure 8:
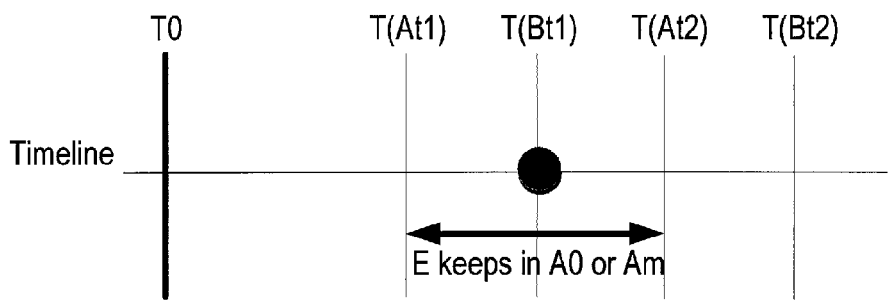
Figure 9:
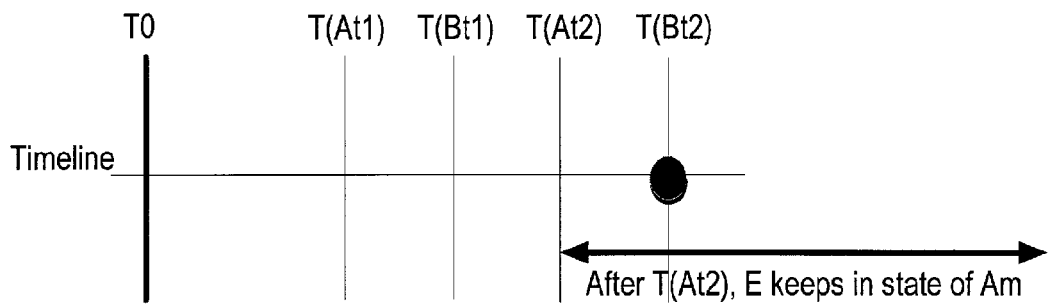

If M(At0) is not unknown and M(Bt0) is not unknown
    If M(At0)<t0 and M(Bt0)<t0
        If (At0, Bt0) is an invalid system state, raise alarm [1],
        Else end to check E as it is a match
    Else add E to skipped entity list as (Exist, Exist) entity
Else if M(At0) is unknown and M(Bt0) is unknown
    End to check E
Else if M(At0) is unknown or M(Bt0) is unknown
    Add E to skipped entity list as (Exist, Not Exist) entity Re-scan logic for entity E (E was picked from the skipped entity list):

Get E's latest state from A, as state At1;

Get E's latest state from B, as state Bt1, where ST(Bt1)>RT(At1);

Get E's latest state from A, as state At2, where ST(At2)>RT(Bt1);

Get E's latest state from B, as state Bt2, where ST(Bt2)>RT(At2);

Check logic:
  For (Exist, Not Exist) entities,
    If M(At1)==M(At2)==unknown and Bt1==Bt2
      If At2 mismatch with Bt1 then raise alarm [2.1];
      Else end to check E.
    Else if At1==At2 and M(Bt1)==M(Bt2)==unknown
      If At2 mismatch with Bt1 then raise alarm [2.2];
      Else end to check E.
    Else add E to skipped entity list.
  For (Exist, Exist) entities,
    If At1==At2 or Bt1==Bt2
      If At2 mismatch with Bt1 then raise alarm [3];
      Else end to check E.
    Else add E to skipped entity list.
Zero False Alarm Proof Method:
To prove (Ai, Bj) is a true alarm, one can prove that there is a point of time or a period of time, at which the E in A's state is Ai, and E in B's state is Bj, then one proves that it is not a false alarm.
  Zero False Alarm Proof.
  With reference to FIG. 7, For alarm [1],
  M(At0)<t0<ST(At0)<=T(At0) → from time M(At0) to T(At0), E was in state At0 in A;
  M(Bt0)<t0<ST(Bt0)<=T(Bt0) → from time M(Bt0) to T(Bt0), E was in state Bt0 in B;
    → Max[M(At0), M(Bt0)]<t0<Min of [ST(At0), ST(Bt0)];
    → (At0, Bt0) is true-positive from time Max[M(At0), M(Bt0)] to time Min of [ST(At0), ST(Bt0)].
  With reference to FIG. 8, For alarm [2.1],
  M(At1) M(At2)==unknown → At1 is A0 or Am, At2 is A0 or Am.
  Assume At1==A0, At2==A0, then from time T(At1) to T(At2), E in A was keeping in state of A0, one can find a time T(Bt1), at which (A0, Bt1) is true-positive.
  Assume At1==Am, At2==Am, then from time T(At1) to T(At2), E in A was keeping in state of Am → so at time T(Bt1), (Am, Bt1) is true-positive.
  With reference to FIG. 9, assume At0==A0, At2==Am, then for any time later than RT(At2), E is in state Am. Because T(Bt2)>ST(Bt2)>RT(At2), at time T(Bt2), (Am, Bt2) is true-positive. Note: situation (At1==Am and At2==A0) is not possible based on System abstraction [1. a, b].
Alarm [2.2] can be proved with the same way as alarm [2.1].
  For alarm [3],
  If At1==At2, because T(At1)<T(Bt1)<T(At2) and M(At1)==M(At2) → at time T(Bt1), (At2, Bt1) is true-positive.
  If Bt1==Bt2, because T(Bt1)<T(At2)<T(Bt2) and M(Bt1)==M(Bt2) → at time T(At2), (At2, Bt1) is true-positive.
Some Additional Combinations and Variations Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

In some embodiments, scanning 522 and rescanning 524 detect state inconsistencies 558 between data entities in repositories or other components 212 of a distributed computing environment. First, entities are scanned based on a cutoff time T0. Entities for which state comparison is undesired are placed 506 in a skipped entity list. Any inconsistencies found in other entities is reported 556 by displaying or printing a list, emailing or texting an administrator, or the like. Then subsequent rescanning fetches 530 state and attempts to pare down the skipped entity list. Rescanning may be capped 540. Inconsistencies may be detected without requiring 560 downtime 564 from services 562 that update data entity state, and false reports of inconsistency may be avoided 510.

Additional Example #1

A computing technology method for detecting data inconsistency includes selecting 566 a cutoff time value T0; scanning 522 data entities 122 in respective components 212, the data entities having data portions 404 which include states 532; putting 506 into a skipped list 204 any scanned data entities which exist in both components but were modified in one or both components after T0; putting 506 into the skipped list any scanned data entities which exist in only one of the components; comparing 514 data portions 404 of data entities which are not in the skipped list, and triggering 518 an inconsistency alarm 520 if any compared entities differ in their data portions; and performing one or more rescanning 524 phases 526 to attempt comparison of states of data entities which are in the skipped list.

Additional Example #2

The method of Additional Example #1, wherein the components 212 are designated here as component A and component B, wherein each of the one or more rescanning phases 526 fetches 530 a recent state 532 of a data entity twice from the components in an interleaved order, namely, fetch from component A then fetch from component B then fetch from component A and then fetch from component B, wherein for cases in which an entity was put 506 into the skipped list because the entity existed 508 in both components but was modified 516 in one or both components after a cutoff time 568 the entity states are compared 514 for inconsistency 558 if the entity state did not change in at least one component during the fetches and otherwise the entity is left 570 in the skipped list, and wherein for cases in which an entity was put 506 into the skipped list because the entity existed 508 in only one of the components the entity states are compared 514 for inconsistency if the entity state did not change in either component during the fetches and otherwise the entity is left 570 in the skipped list.

Additional Example #3

The method of Additional Example #2, wherein the rescanning phases 526 are limited 540 by an execution time 550 cap, a cap on how many rescan rounds 542 are performed, or both. Such caps 608 on rescans, and time difference caps, are each examples of supporting variables 208.

Additional Example #4

The method of Additional Example #1, wherein the method is performed without requiring 560 downtime 564 from any service 562 that updates the data entities.

Additional Example #5

The method of Additional Example #1, wherein the method avoids 510 false alarms 512 in that only actual data inconsistencies trigger 518 the inconsistency alarm 520.

Additional Example #6

A computer-readable storage medium configured with executable instructions 116 to perform any of methods of Additional Examples #1 through #5.

Additional Example #7

A distributed computing system 200 equipped for data inconsistency detection, the system including: at least two components 212, each component 212 having at least one processor 110, a memory 112 in operable communication with the processor, and data entities 122 which have respective states 532; consistency check software 124 residing in at least one memory and executable with at least one processor to perform a method which (a) puts 506 into a skipped list 204 any data entities E_E which exist 508 in both components but were modified 516 in one or both components after a cutoff time value T0, (b) puts 506 into the skipped list any scanned data entities E_N which exist 508 in only one of the components, (c) compares 514 states of data entities which are not in the skipped list, (d) reports 556 an inconsistency if any compared entities differ in their states, and (e) performs one or more rescanning phases 526 to attempt comparison of states of data entities which are in the skipped list.

Additional Example #8

The system of Additional Example #7, wherein consistency check software (f) fetches 530 more recent states 532 of an entity from the components, (g) compares 514 states for an entity E_E when the entity state did not change in at least one component during the fetches, (h) compares 514 states for an entity E_N when the entity state did not change in either component during the fetches, (i) otherwise leaves 570 entities in the skipped list, and (j) reports any entities whose states are inconsistent when compared.

Additional Example #9

The system of Additional Example #8, wherein the rescanning phases are limited 540 by a supporting variable 208 which includes a cap on execution time 550, a cap on how many rescan rounds 542 are performed, or both.

Additional Example #10

The system of Additional Example #7, wherein the system includes a service 562 that updates the states of data entities, and wherein the consistency check software executes and reports 556 any inconsistencies without requiring 560 downtime 564 from the service.

Additional Example #11

The system of Additional Example #7, wherein the consistency check software avoids 510 false alarms 512 in that only actual data inconsistencies are reported 556.

One of skill will recognize that some innovations described herein can improve the functioning of a computer system itself by reducing or eliminating downtime required to perform a data consistency check, can improve distributed data technology scalability by providing an algorithm to identify inconsistencies in data that is stored in distributed repositories (and to isolate inconsistent data), and improve data protection technology compared to continuous data protection because the present innovations help protect data consistency while placing less demand on network and storage resources. One of skill also recognizes the inherently digital and computational nature of the operations taught, which cannot effectively be performed by mere mental steps or paper and pencil. In addition, some innovations herein can be characterized as an improvement to data inconsistency filtering technology, which is useful for identifying and filtering out inconsistent data in a system of distributed data repositories. Some of the innovations offer the redundancy and scalability benefits of distributing data plus the consistency benefit of using a single data repository.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 5 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method for detecting data inconsistency, the method comprising:
    selecting a cutoff time value T0;
    scanning data entities stored in each of two repositories, the data entities having data portions;
    adding to a skipped list any scanned data entities which exist in both repositories but were modified in one or both repositories after T0;
    adding to the skipped list any scanned data entities which exist in only one of the repositories;
    comparing data portions of scanned data entities which exist in both repositories and are not in the skipped list, and triggering an inconsistency alarm if any compared data portions differ from one another; and
    performing one or more rescanning phases to compare data entities listed in the skipped list, wherein each of the one or more rescanning phases fetches a recent state of a data entity listed in the skipped list twice from the repositories and determines if the fetched states of the data entity changed in at least one repository during the fetches.

2. The method of claim 1, wherein each of the one or more rescanning phases fetches the recent state of the data entity twice from the repositories in an interleaved order, and wherein:
    for cases in which the data entity was added to the skipped list because the data entity existed in both repositories but was modified in one or both repositories after T0, the fetched entity states are compared for inconsistency if the fetched entity states did not change in at least one repository during the fetches, and otherwise the data entity is left in the skipped list, and
    for cases in which data entity was added to the skipped list because the data entity existed in only one of the repositories, the fetched entity states are compared for inconsistency if the fetched entity states did not change in either repository during the fetches, and otherwise the data entity is left in the skipped list.

3. The method of claim 2, wherein the one or more rescanning phases are limited by at least one of an execution time cap or a cap on how many rescanning phases are performed.

4. The method of claim 1, wherein the method is performed without requiring downtime from any service that updates the data entities.

5. The method of claim 1, wherein only actual data inconsistencies trigger the inconsistency alarm.

6. The method of claim 2, wherein the method comprises checking for data inconsistency between a first repository and a second repository, checking for data inconsistency between the second repository and a third repository, and consolidating results of said checking by adding the results to a single issues list.

7. The method of claim 1, wherein the method verifies data consistency across data repositories after a restore.

8. The method of claim 1, wherein the method detects at least one data inconsistency without restricting data use to only a single-data-store and without a data-size-proportional-downtime restriction.

9. The method of claim 1, wherein the compared data portions include only data seen by users.

10. A distributed computing system equipped for data inconsistency detection, the system comprising:
    at least two repositories, each repository comprising at least one processor, a memory in operable communication with the processor, and data entities which have respective states; and
    consistency check software residing in at least one memory and executable by at least one processor to (a) add to a skipped list any data entities E_E which exist in both repositories but were modified in one or both repositories after a cutoff time T0, (b) add to the skipped list any scanned data entities E_N which exist in only one of the repositories, (c) compare data entities which exist in both repositories and are not in the skipped list, (d) report an inconsistency if any of the compared data entities have different states, and (e) perform one or more rescanning phases to compare data entities listed in the skipped list, wherein each of the one or more rescanning phases fetches a recent state of a data entity listed in the skipped list twice from the repositories and determines if the fetched states of the data entity changed in at least one repository during the fetches.

11. The system of claim 10, wherein the consistency check software is executable by the at least one processor to (f) fetch more recent states of an entity from the repositories, (g) compares states of each entity E_E for which the state did not change in at least one repository during the fetches, (h) compare states of each entity E_N for which the state did not change in either repository during the fetches, and (j) report any entities whose states are inconsistent when compared at (g) or (h).

12. The system of claim 11, wherein the one or more rescanning phases are limited by at least one of a cap on execution time or a cap on a number of rescanning phases.

13. The system of claim 10, wherein the system includes a service that updates the states of data entities, and wherein the consistency check software executes and reports any inconsistencies without requiring downtime from the service.

14. The system of claim 10, wherein the consistency check software does not consider differences in bits following an end-of-file marker.

15. A computer-readable storage medium not consisting of signals per se, configured with executable instructions to detect data inconsistency in a distributed computing environment, the executable instructions configured to at least:
select a cutoff time value T0;
scan data entities stored in each of two repositories, the data entities having data portions;
add to a skipped list any scanned data entities which exist in both repositories but were modified in one or both repositories after T0;
add to the skipped list any scanned data entities which exist in only one of the repositories;
compare data portions of scanned data entities which exist in both repositories and are not in the skipped list, and triggering an inconsistency alarm if any compared data portions differ from one another; and
perform one or more rescanning phases to compare data entities listed in the skipped list, wherein each of the one or more rescanning phases fetches a recent state of a data entity twice from the repositories, wherein for cases in which an entity was added to the skipped list because the entity existed in both repositories but was modified in one or both repositories after T0, the fetched entity states are compared for inconsistency if the entity state did not change in at least one repository during the fetches and otherwise the entity is left in the skipped list, and wherein for cases in which an entity was added to the skipped list because the entity existed in only one of the repositories, the fetched entity states are compared for inconsistency if the entity state did not change in either repository during the fetches and otherwise the entity is left in the skipped list.

16. The computer-readable storage medium not consisting of signals per se of claim 15, wherein the rescanning phases are limited by at least an execution time cap.

17. The computer-readable storage medium not consisting of signals per se of claim 15, wherein the rescanning phases are limited by at least a cap on how many rescan rounds are performed.

18. The computer-readable storage medium not consisting of signals per se of claim 15, wherein an inconsistency alarm is not triggered in relation to an entity which is not present in one of the repositories.

19. The computer-readable storage medium not consisting of signals per se of claim 15, wherein the executable instructions are also configured to verify data consistency across data repositories.

20. The computer-readable storage medium not consisting of signals per se of claim 15, wherein a difference in a characteristic of physical storage of two compared data portions is not considered a difference between the two compared data portions.

* * * * *